US00RE49861E

(19) United States
(12) Reissued Patent
Smith et al.

(10) Patent Number: US RE49,861 E
(45) **Date of Reissued Patent: *Mar. 5, 2024**

(54) TORREFACTION PROCESS

(71) Applicant: Komax Systems, Inc., Huntington Beach, CA (US)

(72) Inventors: Nolan Smith, Redondo Beach, CA (US); Seungsuk Lee, Cypress, CA (US); Hayden Smith, Seal Beach, CA (US)

(73) Assignee: Komax Systems, Inc., Huntington Beach, CA (US)

( * ) Notice: This patent is subject to a terminal disclaimer.

(21) Appl. No.: 17/706,455

(22) Filed: Mar. 28, 2022

Related U.S. Patent Documents

Reissue of:

(64) Patent No.: 10,865,356
Issued: Dec. 15, 2020
Appl. No.: 16/994,540
Filed: Aug. 14, 2020

(51) Int. Cl.
*C10L 9/08* (2006.01)
*B01J 19/24* (2006.01)
(Continued)

(52) U.S. Cl.
CPC ..... *C10L 9/083* (2013.01); *B01J 19/243* (2013.01); *B01J 19/244* (2013.01); *C10B 49/14* (2013.01);
(Continued)

(58) Field of Classification Search
CPC ..... C10L 5/442; C10L 5/445; C10L 9/083; C10L 9/086; C10L 2290/06;
(Continued)

(56) References Cited

U.S. PATENT DOCUMENTS 5,758,967 A 6/1998 King
9,758,738 B2 9/2017 Seidner et al.
(Continued)

FOREIGN PATENT DOCUMENTS

CN 103933924 A * 7/2014
CN 108728144 A 11/2018
(Continued)

OTHER PUBLICATIONS

English translation of CN-108728144-A retrieved from EPO's Espacenet website.*
(Continued)

*Primary Examiner* — Peter C English
(74) *Attorney, Agent, or Firm* — Knobbe, Martens, Olson & Bear LLP

(57) ABSTRACT

A method of converting cellulosic feedstock to bio coal. The cellulosic feedstock in a carrier of process fluid is introduced within a conduit having substantially linear portions connected by curved portions creating a serpentine structure. The substantially linear portions are surrounded by tubular sleeves creating annular spaces between the tubular sleeves and substantially linear portions for carrying a high temperature fluid for transferring thermal energy to the cellulosic feedstock and process fluid. The cellulosic feedstock is maintained in an oxygen-free environment. The method is continuous as the cellulosic feedstock in process fluid is subjected to a plurality of mixing elements characterized as having no edges perpendicular to the longitudinal axes of the plurality of substantially linear segments and which are sized and positioned within the plurality of substantially
(Continued)

AMENDED linear segments such no mixing elements are in contact with one another resulting in an open region of travel for fluids passing from the conduit inlet to conduit outlet.

12 Claims, 2 Drawing Sheets

(51) Int. Cl.
*C10B 49/14* (2006.01)
*C10B 53/02* (2006.01)
*C10L 5/44* (2006.01)

(52) U.S. Cl.
CPC ..... *C10B 53/02* (2013.01); *C10L 5/442* (2013.01); *C10L 5/445* (2013.01); *B01J 2219/0077* (2013.01); *C10L 2290/06* (2013.01); *C10L 2290/24* (2013.01); *C10L 2290/56* (2013.01); *Y02E 50/10* (2013.01); *Y02E 50/30* (2013.01)

(58) Field of Classification Search
CPC ..... C10L 2290/08; C10L 2290/24; C10L 2290/56; C10B 47/22; C10B 47/26; C10B 49/14; C10B 53/02; B01J 19/242; B01J 19/243; B01J 19/244; B01J 2219/00761; B01J 2219/00765; B01J 2219/0077; Y02E 50/10; Y02E 50/30
See application file for complete search history.

(56) References Cited

U.S. PATENT DOCUMENTS

2007/0266623 A1* 11/2007 Paoluccio ..... C10L 9/083 44/629
2008/0206129 A1* 8/2008 Vygonyaylo et al. ..... B01J 19/242 423/645
2012/0117815 A1* 5/2012 Wechsler ..... C10L 9/083 34/282
2014/0287488 A1 9/2014 Wells et al.
2020/0056098 A1 2/2020 Seidner

FOREIGN PATENT DOCUMENTS

CN 110527535 A * 12/2019
EP 2166061 A1 * 3/2010 ..... C10B 47/30
WO WO-2008095589 A1 * 8/2008 ..... C10G 1/02
WO WO-2014167141 A1 * 10/2014 ..... C10L 9/083
WO WO-2020041144 A1 2/2020

OTHER PUBLICATIONS

English translation of EP-2166061-A1 retrieved from EPO's Espacenet website.*
English translation of WO-2008095589-A1 retrieved from EPO's Espacenet website.*
English translation of CN-103933924-A retrieved from EPO's Espacenet website.*
English translation of CN-110527535-A retrieved from EPO's Espacenet website.*

* cited by examiner

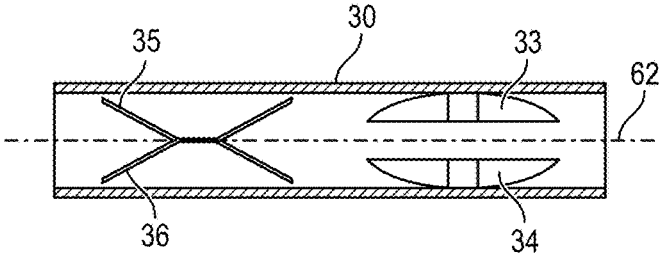
FIG. 4
AMENDED
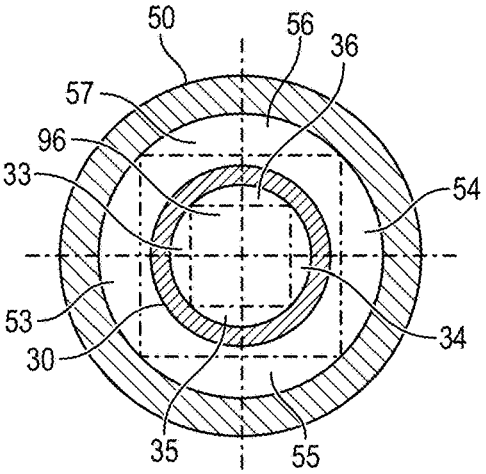
FIG. 5
AMENDED

TORREFACTION PROCESS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is an application for reissue of U.S. Pat. No. 10,865,356, which issued Dec. 15, 2020 from U.S. patent application Ser. No. 16/994,540 filed on Aug. 14, 2020.*

*Notice: More than one reissue application has been filed for the reissue of U.S. Pat. No. 10,865,356. The reissue applications include (1) the present application (U.S. patent application Ser. No. 17/706,455, filed Mar. 28, 2022) for reissue of U.S. Pat. No. 10,865,356; and (2) U.S. application Ser. No. 18/081,588, filed Dec. 14, 2022, which is a continuation reissue application of U.S. patent application Ser. No. 17/706,455, filed Mar. 28, 2022, which is an application for reissue of U.S. Pat. No. 10,865,356.*

TECHNICAL FIELD OF THE INVENTION

The present invention involves a method of converting cellulosic feedstock to bio coal. The method employs the process of torrefaction but uses a proprietary heat exchanger/non-clogging mixers in an oxygen free environment resulting in a process which is much more convenient and cost efficient than prior art attempts to create bio coal.

BACKGROUND OF THE INVENTION

Torrefaction is a process involved in creating bio coal from cellulosic feedstock such as wood, grain or, for example, nut shells. Pyrolysis is generally carried out at temperatures between approximately 200 and 320° C. When carried out in an oxygen free environment, torrefaction produces a relatively dry product which reduces or eliminates its potential for organic decomposition creating an energy-dense fuel as a potentially important energy source. The process can be carried out under atmospheric pressure where water contained in the biomass as well as other volatiles are released and the cellulosic feedstock partially decomposes. The final product is a solid, dry, blackened material that is referred to as torrefied biomass or bio coal generally formed into briquettes, pellets or other convenient shapes. After the biomass is torrefied it can be classified, usually into briquettes to increase its mass and energy density and to improve its hydrophobic properties.

Torrefied and intensified biomass has several advantages over conventional fuels which makes it a competitive option compared to conventional biomass wood pellets. Specifically, the torrefied biomass has a higher energy density, is homogeneous, exhibits hydrophobic behavior such that it repels water and when combined with densification, makes bulk storage in open air feasible and burns much cleaner than coal and is thus better for the environment. Furthermore, biological activity is eliminated while improving grindability.

Traditionally, torrefaction is achieved using rotary dryers in either a vacuum chamber or a chamber that is nitrogen charged which utilizes burners as a heat source. Such a process is extremely expensive both as to capital and maintenance costs which challenges any attempt to create a profitable process. Prior processes are also very slow and difficult to yield bio coal; typically, such processes produce about 300,000 tons per year.

It is thus an object of the present invention to provide a process employing proprietary technology to create bio coal by torrefaction while reducing initial capital expenditures as well as maintenance costs.

These and other objects will be more readily apparent when considering the following disclosure and appended claims.

SUMMARY OF THE INVENTION

A method of converting cellulosic feedstock to bio coal comprising: Providing a conduit comprising a plurality of substantially linear segments having a linear segment diameter, longitudinal axes and a substantially circular circumference, said conduit further having an inlet and an outlet and a plurality of curved segments creating a substantially serpentine structure;

providing a plurality of substantially tubular sleeves around said substantially linear segments and having longitudinal axes substantially coincident with said longitudinal axes of said substantially linear segments of said conduit creating a plurality of annular spaces, said plurality of substantially tubular sleeves being in fluid communication and having a tubular sleeve inlet and tubular sleeve outlet;

providing a plurality of mixing elements within a plurality of said substantially linear segments, said plurality of mixing elements having no edges perpendicular to said longitudinal axes of said plurality of substantially linear segments and sized and positioned within said plurality of substantially linear segments such that at any plane passing perpendicularly to said longitudinal axes, at least 75% of the circumference of each substantially linear segment to which said mixing elements are placed is free of any mixing element and no mixing elements are in contact with one another resulting in an open region of travel for fluids passing from said conduit inlet to said conduit outlet;

feeding a cellulosic feedstock carried by a process fluid to said conduit inlet;

feeding a heating fluid to said tubular sleeve inlet causing said heating fluid to pass within said annular spaces;

facilitating heat transfer between said heating fluid and said cellulosic feedstock; and maintaining said cellulosic feedstock and process fluid as a substantially oxygen-free fluid stream for a sufficient time to convert said cellulosic feedstock to said bio coal.

BRIEF DESCRIPTION OF THE DRAWINGS

FIG. 4 is a cross-sectional side view of the linear segment of FIG. 3 again illustrating the preferred mixing elements used in conjunction therewith.

FIG. 5 is an end plan view of the device use in carrying out the claimed method taken along cross section 5-5 of FIG. 1.

DETAILED DESCRIPTION OF THE INVENTION

Figure 1:
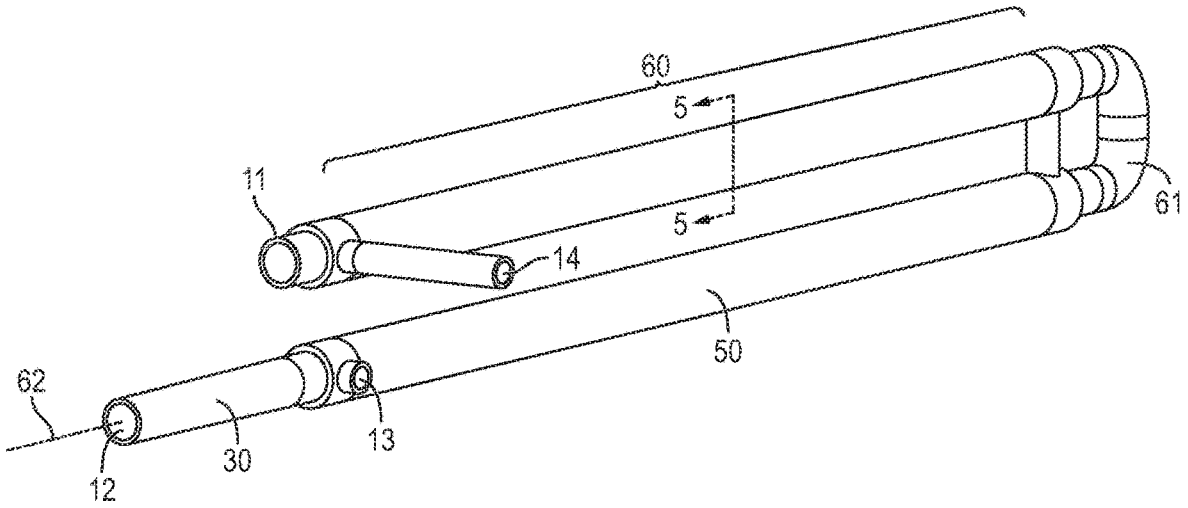
FIG. 1 is a perspective view of a segment of the device used in carrying out the claimed method.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

As noted previously, prior attempts to produce bio coal through torrefaction have not been cost-effective both in terms of capital expenditures and maintenance costs. In addressing these issues, the present invention employs a device as depicted in the appended figures in carrying out the presently claimed method.

Figure 2:
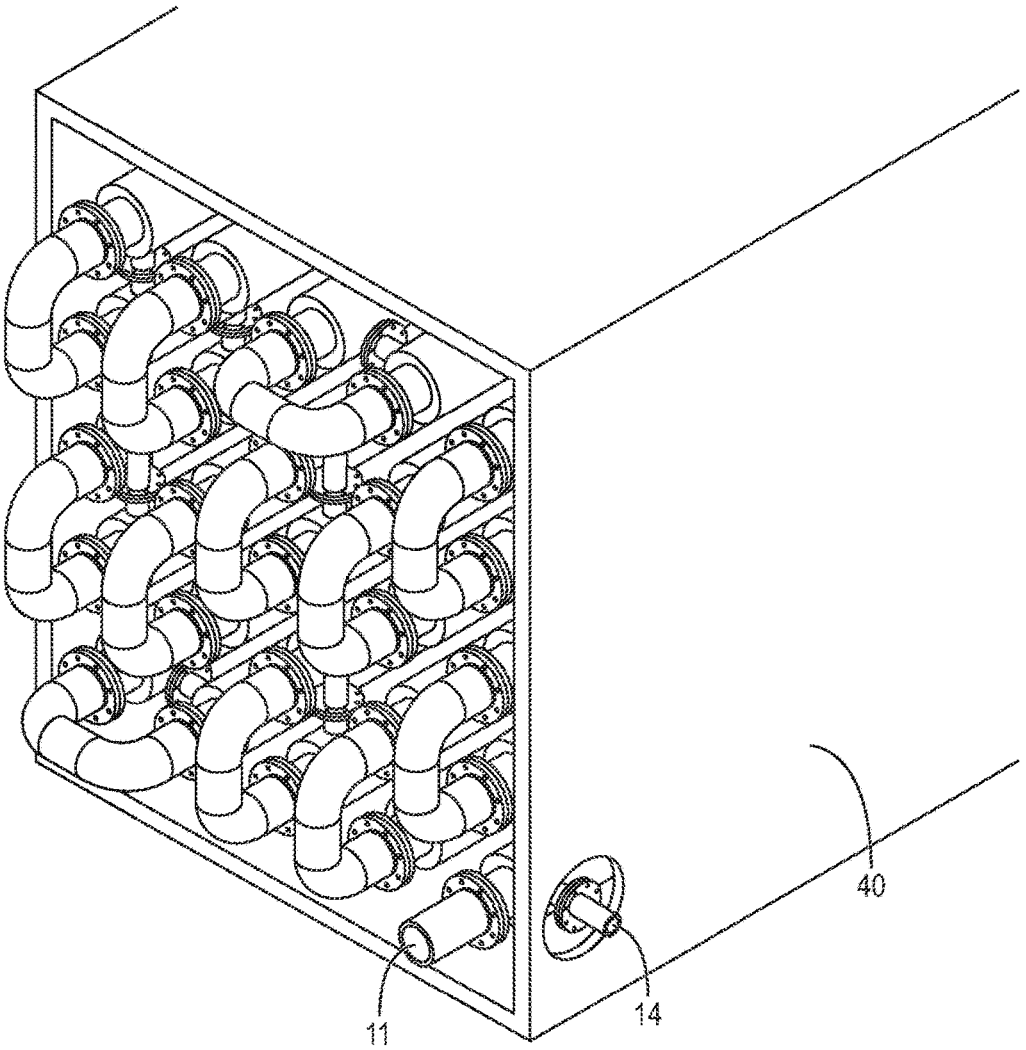
FIG. 2 is an array of segments as illustrated in FIG. 1 configured in a modular form factor for use alone or in conjunction with similar arrays in carrying out the claimed method.

In turning to FIG. 1, the device of the present invention for carrying out the claimed method is, in effect, a double-pipe heat exchanger such that process fluid carrying the requisite cellulosic material flows through pipe 30 typically having a wall thickness of approximately ⅛ to 0.375 inches having linear sections 60, a linear section diameter, longitudinal axes 62 and substantially circular circumference. Pipe 30 is provided with inlet 11 and outlet 12, linear segments [30] *60* being joined by curved segments 61 creating a substantially serpentine structure. The segments are joined with others creating an array as depicted in FIG. 2. Such arrays can be contained within housing 40 as standalone modular units which can be joined to similar modular units for increasing the overall length of the device as needed. Typically, torrefaction can be completed in practicing the present method by pipe lengths of approximately ⅓ to 2 miles with pipes having a thermal conductivity of 10-55 W/(m*C).

In that the device depicted herein acts, in effect, as a countercurrent heat exchanger, linear segments 60 are surrounded by sleeves 50 creating annular spaces 56 (FIG. 5). The ratio of pipe diameter to sleeve diameter is typically approximately 0.522 to 0.875. The cellulosic feedstock carried by process fluid is introduced to the device at inlet 11 and heating fluid introduced to sleeves 50 at inlet 13 and having outlet 14 thus filling annular spaces 56. As shown, longitudinal axes of tubular sleeves 50 coincide with longitudinal axes 62 of pipe 30. When stacked as shown in FIG. 2, outlet 12 of pipe 30 is in fluid communication with inlet 11 of the next downstream pipe and outlet 14 of sleeve 50 is in fluid communication with inlet 13 of a downstream annular space 56.

To facilitate the uniform mixing of the cellulosic material, such as wood chips or nut shells within the process fluid, mixing elements 33, 34, 35 and 36 are provided. These mixing elements are capable of mixing the cellulosic material and process fluid while not creating nooks or dead spaces which would act to inhibit fluid flow within conduit 30.

Figure 3:
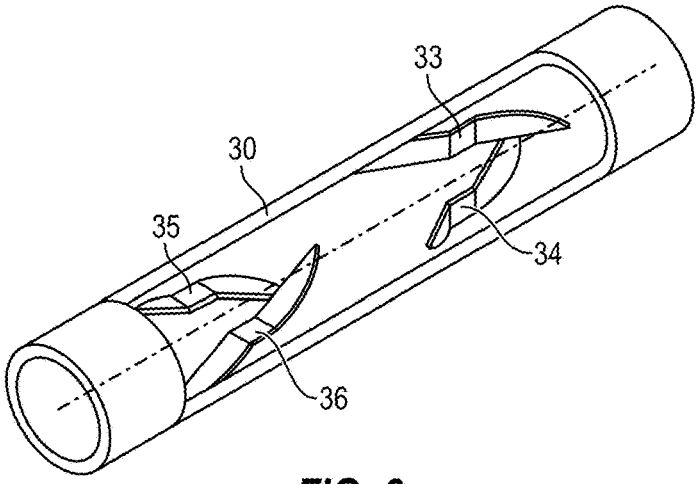
FIG. 3 is a cutaway perspective view of a linear segment of the device used in carrying out the claimed method illustrating the preferred mixing elements used in conjunction therewith.

In turning to FIGS. 3-5, mixing elements 33, 34, 35 and 36 are characterized as having no edges or surfaces perpendicular to longitudinal axes 62 and are sized so that no such elements are in contact with one another resulting in an open region of travel 96 for fluids passing through conduit 30 along its longitudinal axis. Ideally, each mixing element is seated within conduit 30 at an angle between approximately 25° to 45° to said longitudinal axis. Most importantly, however, the mixing elements are positioned within conduit or [pure] *pipe* 30 as to not inhibit flow or clog as these are provided with no points of contact and no nooks or crotches which would otherwise result in fluid hangup. Ideally these mixing elements enable cellulosic material carried within heat transfer fluid having effective diameters of 40% or more of the conduit diameter to pass through the conduit without entrainment. Such a geometry is disclosed and claimed in U.S. Pat. No. 5,758,967, the disclosure of which is incorporated by reference.

As a preferred embodiment, the mixing elements are provided as pairs such as 33/34 and 35/36. Each complementary pair causes flowing material to rotate about axis 62 of conduit 30 in opposite directions. As is further noted, the four mixing elements are each shown primarily as a circular segments each of a height of approximately D/10 wherein D is the diameter of conduit 30. Various mixing elements are set in a non-opposing fashion at the pipe wall so as to present to the fluid in any plane normal to axes 62 of conduit 30 a non-symmetrical cross-section. This serves to break up the normal circular symmetry of flow and to substantially reduce the length of conduit 30 necessary to achieve torrefaction.

Ideally, the heating or high temperature fluid has a specific heat of approximately 0.26 to 0.40 BTU/(lb*° F.) and capable of exhibiting an inlet temperature of approximately 900 to 1500° F. An excellent example would be a molten salt. The process fluid is introduced at typical inlet temperatures between approximately 100 to 400° F. and can be any liquid having a high boiling point and which is devoid of oxygen. An example of a suitable process fluid with a relatively high boiling point as to not boil off while the cellulosic feedstock is being processed is an oil available by Permanente Corporation sold under the brand name GRC88. As noted, the heating fluid passes within annulus 56 which can also be configured with mixing elements 53, 54, 55 and [56] *57* which are used in pairs causing fluid to rotate in opposite directions. These mixing elements are employed in order to ensure even temperature of the heating fluid as uneven temperature gradients could lead to the heating fluid parially solidifying within the annular space. These elements are used as a low pressure drop solution in order to increase turbulence in the annulus, thus ensuring uniform temperature gradient across the cross-section.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

The invention claimed is:

[1. A method of converting cellulosic feedstock to bio coal comprising:

Providing a conduit comprising a plurality of linear segments having a linear segment diameter, longitudinal axes and circular circumference, said conduit further having an inlet and an outlet and a plurality of curved segments creating a serpentine structure;

providing a plurality of tubular sleeves around said linear segments and having longitudinal axes coincident with said longitudinal axes of said linear segments of said conduit creating a plurality of annular spaces, said plurality of tubular sleeves being in fluid communication and having a tubular sleeve inlet and tubular sleeve outlet;

providing a plurality of mixing elements within a plurality of said linear segments, said plurality of mixing elements having no edges perpendicular to said longitudinal axes of said plurality of linear segments and are sized and positioned within said plurality of linear segments such that no mixing elements are in contact with one another, and are free of nooks and crotches which would otherwise result in fluid hangup and which results in an open region of travel for fluids passing from said conduit inlet to said conduit outlet;

feeding a cellulosic feedstock carried by a process fluid to said conduit inlet;

feeding a heating fluid to said tubular sleeve inlet causing said heating fluid to pass within said annular spaces;

facilitating heat transfer between said heating fluid and said cellulosic feedstock; and maintaining said cellulosic feedstock and process fluid as a substantially oxygen-free fluid stream for a sufficient time to convert said cellulosic feedstock to said bio coal.]

[2. The method of claim 1 wherein said mixing elements are provided in said linear segments in complementary pairs, wherein adjacent mixing elements cause said cellulosic feedstock and process fluid passing therein to rotate in opposite directions.]

3. The method of claim [1] *14* wherein each mixing element located within each of said linear segments is seated at an angle between approximately 25° to 45° to said longitudinal axes.

4. The method of claim [1] *14* wherein said mixing elements *within said linear segments* are in the form of primarily circular segments wherein each mixing element *within said linear segments* is characterized as being widest in profile at its midpoint and narrowest at its longitudinal endpoints.

5. The method of claim 4 wherein each mixing element *within said linear segments* is of a height equal to approximately D/10 where D is the diameter of said linear segments.

6. The method of claim [1] *14* wherein said heating fluid is [any] *a* fluid capable of flowing at temperatures over 1000° F. and having *a* boiling point[s] in excess of 1000° F.

[7. The method of claim 6 wherein said heating fluid comprises molten salt.]

8. The method of claim [1] *14* wherein said cellulosic feedstock comprises a [member] *material* selected from the group consisting of wood chips and nut shells.

[9. The method of claim 1 wherein said feedstock in said process fluid moves counter currently within said conduit to said heating fluid traveling within said annular spaces.]

[10. The method of claim 1 further comprising mixing elements within said annular space for increasing turbulence and for improving uniform temperatures of said heating fluid passing therein.]

11. The method of claim [10] *14* wherein said mixing elements within said annular space are provided in complementary pairs, wherein adjacent mixing elements cause said heating fluid passing therein to rotate in opposite directions.

12. The method of claim [1] *14* wherein said mixing elements positioned within said linear segments are sized such that cellulosic feedstock carried by process fluid having a size of at least 40% of the linear *segment* diameter passes there through.

*13. A method for converting cellulosic feedstock to bio coal comprising:*

*providing a conduit comprising a plurality of linear segments having a linear segment diameter, longitudinal axes and circular circumference, said conduit further having an inlet and an outlet and a plurality of curved segments creating a serpentine structure;*

*providing a plurality of tubular sleeves around said linear segments and having longitudinal axes coincident with said longitudinal axes of said linear segments of said conduit creating a plurality of annular spaces, said plurality of tubular sleeves being in fluid communication and having a tubular sleeve inlet and tubular sleeve outlet;*

*providing a plurality of mixing elements within a plurality of said linear segments, said plurality of mixing elements having no edges perpendicular to said longitudinal axes of said plurality of linear segments and are sized and positioned within said plurality of linear segments such that no mixing elements are in contact with one another, and are free of nooks and crotches which would otherwise result in fluid hangup and which results in an open region of travel for fluids passing from said conduit inlet to said conduit outlet;*

*feeding a cellulosic feedstock carried by a process fluid to said conduit inlet;*

*feeding a heating fluid to said tubular sleeve inlet causing said heating fluid to pass within said annular spaces to effect heat transfer between said heating fluid and said cellulosic feedstock; and*

*providing mixing elements within said annular spaces for increasing turbulence of said heating fluid passing therein.*

*14. The method of claim 13 wherein said heating fluid is a fluid with a specific heat of approximately 0.26 to 0.40 BTU/(lb*° F.) and capable of exhibiting a temperature of approximately 900° F. to 1500° F.*

*15. The method of claim 13 wherein said mixing elements are provided in said linear segments in complementary pairs, wherein adjacent mixing elements cause said cellulosic feedstock and process fluid passing therein to rotate in opposite directions.*

*16. The method of claim 13 wherein said heating fluid comprises molten salt.*

*17. The method of claim 13 wherein said feedstock in said process fluid moves counter currently within said conduit to said heating fluid traveling within said annular spaces.*

* * * * *